US012310374B2

(12) United States Patent
Knodel

(10) Patent No.: US 12,310,374 B2
(45) Date of Patent: May 27, 2025

(54) SEPARATOR WITH CRIMPING MEMBER FOR SEPARATING PORTIONS FROM ELONGATE CASINGS STUFFED WITH FOOD MASS, AND ASSOCIATED METHODS

(71) Applicant: VEMAG Maschinenbau GmbH, Verden (DE)

(72) Inventor: Peter Knodel, Oyten (DE)

(73) Assignee: VEMAG Maschinenbau GmbH, Verden (DE)

( * ) Notice: Subject to any disclaimer, the term of this patent is extended or adjusted under 35 U.S.C. 154(b) by 94 days.

(21) Appl. No.: 17/739,874

(22) Filed: May 9, 2022

(65) Prior Publication Data

US 2022/0361513 A1     Nov. 17, 2022

(30) Foreign Application Priority Data

May 12, 2021    (DE) .......................... 102021112517.0

(51) Int. Cl.
     *A22C 11/10*      (2006.01)
     *A22C 11/00*      (2006.01)

(52) U.S. Cl.
     CPC .......... *A22C 11/104* (2013.01); *A22C 11/006* (2013.01); *A22C 11/105* (2013.01); *A22C 11/108* (2013.01)

(58) Field of Classification Search
     CPC . A22C 11/006; A22C 11/008; A22C 11/0254; A22C 11/104; A22C 11/105; A22C 11/108
     USPC ............................................. 452/46, 48, 49
     See application file for complete search history.

(56) References Cited

U.S. PATENT DOCUMENTS

| | | | | |
|---|---|---|---|---|
| 4,129,923 A * | 12/1978 | Hoegger | ................. | A22C 11/00 452/34 |
| 5,788,563 A * | 8/1998 | Nakamura | ........... | A22C 11/107 452/47 |
| 6,050,888 A * | 4/2000 | Nakamura | ............. | A22C 11/02 452/47 |
| 6,080,054 A | 6/2000 | Muller et al. | | |

(Continued)

FOREIGN PATENT DOCUMENTS

| | | |
|---|---|---|
| DE | 102021112513 B3 | 6/2022 |
| EP | 0941662 B1 | 7/2002 |
| WO | 2017081648 A1 | 5/2017 |

OTHER PUBLICATIONS

European Patent Office, Search Report issued in EP application No. 22172975.9, dated Oct. 10, 2022 (8 pages).

*Primary Examiner* — David J Parsley
(74) *Attorney, Agent, or Firm* — Wood Herron & Evans LLP

(57) ABSTRACT

A separator is provided for separating portions from elongate casings stuffed with food mass, in particular for separating sausages from alginate casings stuffed with sausage meat. The separator includes two circulating conveyor members spaced apart from one another and drivable by at least one drive element, and at least one crimping member arranged on each conveyor member. It is proposed that the legs of a crimping portion of the crimping members are curved on their side facing an adjacently arranged second crimping member in operation, such that the stuffed casing is first constricted in a constriction region with displacement of the food mass and then severed, producing a desirable shape for the portions separated.

15 Claims, 9 Drawing Sheets

(56) References Cited

U.S. PATENT DOCUMENTS

| | | |
|---|---|---|
| 6,482,079 B1 | 11/2002 | Nakamura et al. |
| 8,641,484 B1 | 2/2014 | Weers et al. |
| 10,076,122 B1 | 9/2018 | Thring et al. |

* cited by examiner

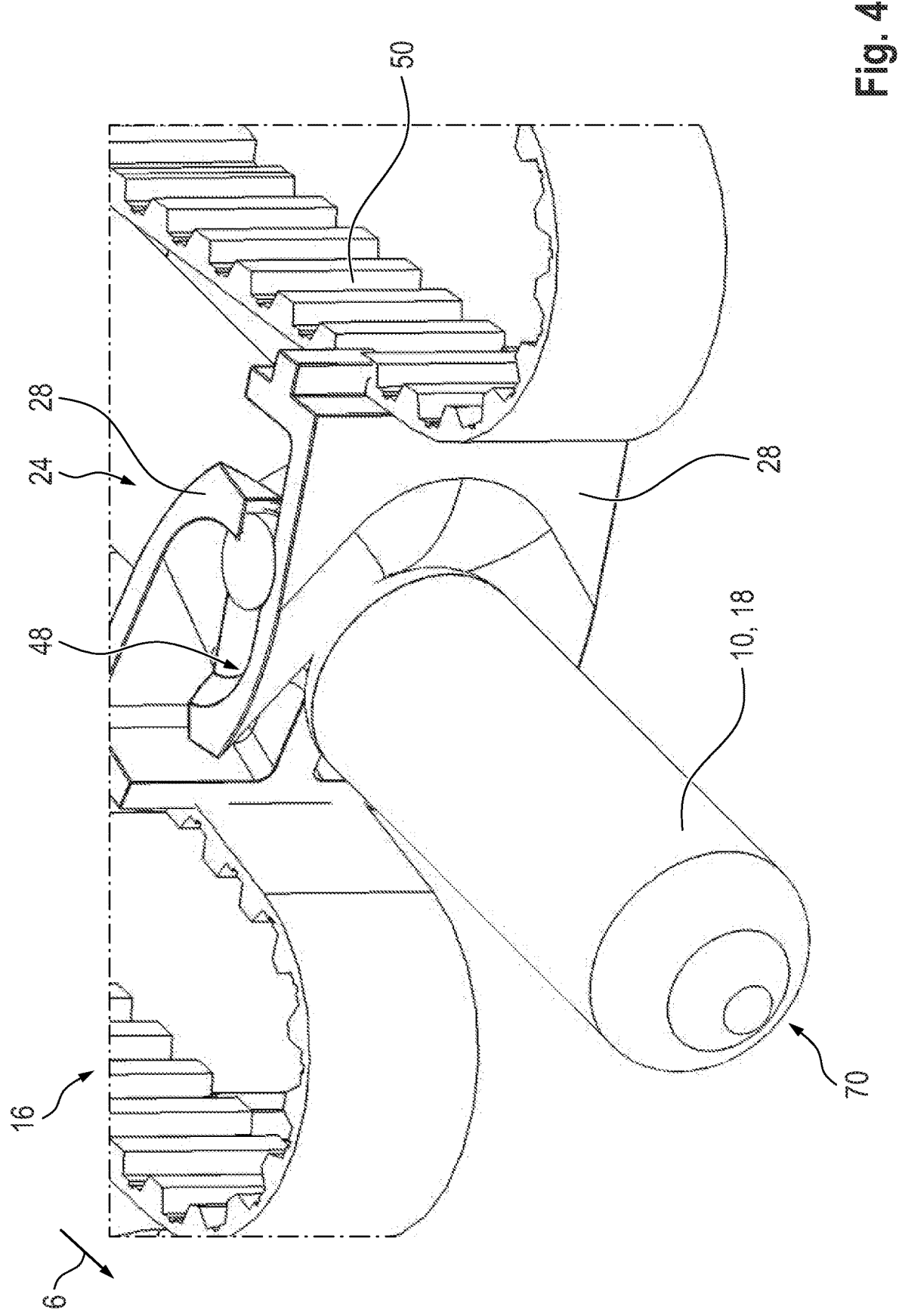

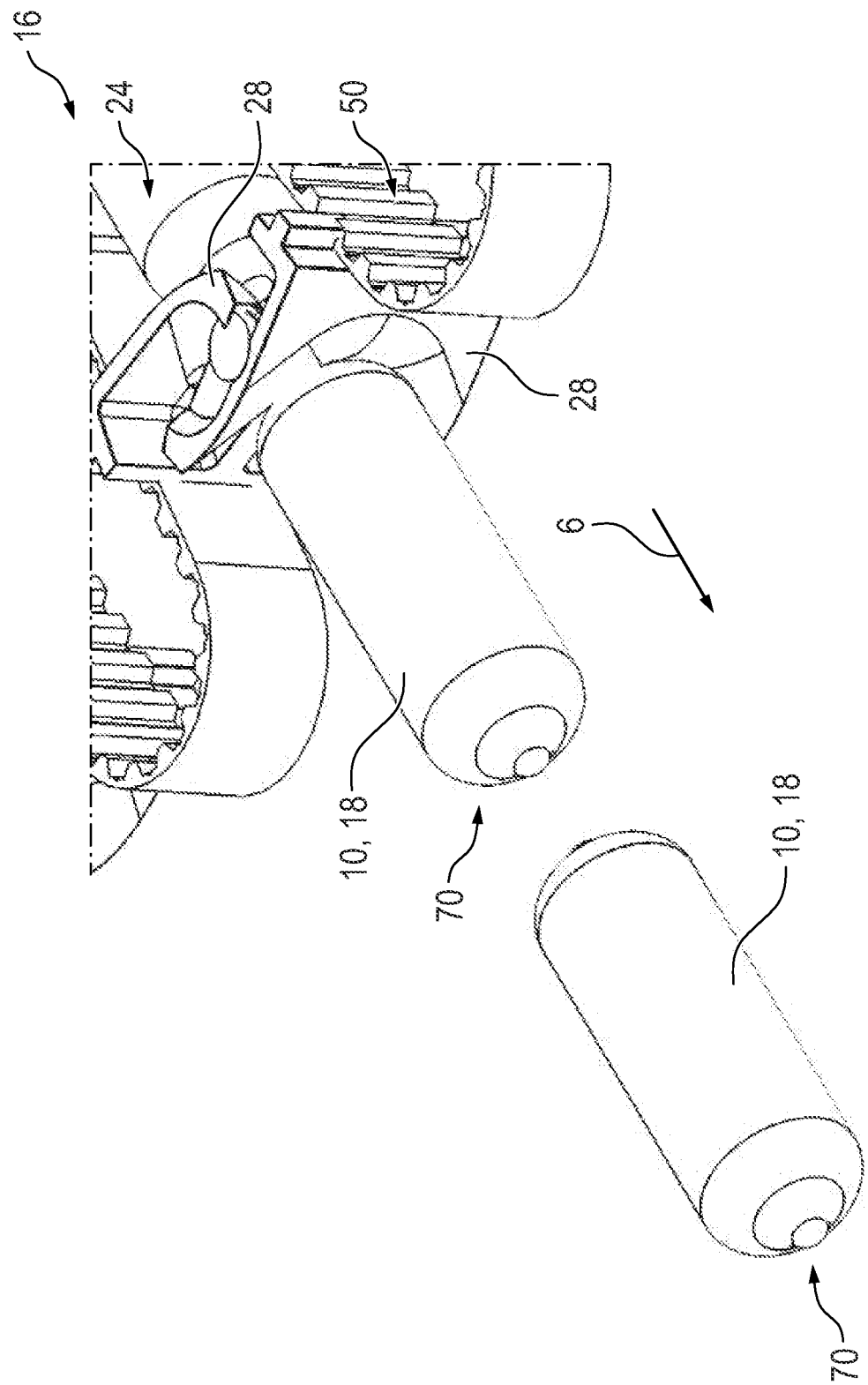

SEPARATOR WITH CRIMPING MEMBER FOR SEPARATING PORTIONS FROM ELONGATE CASINGS STUFFED WITH FOOD MASS, AND ASSOCIATED METHODS

CROSS-REFERENCE TO RELATED APPLICATION

This application claims priority to German Application No. 10 2021 112 517.0, filed May 12, 2021. The above-mentioned patent application is incorporated herein by reference in its entirety.

TECHNICAL FIELD

This application relates to a separator for separating portions from elongate casings stuffed with food mass, in particular for separating sausages from alginate casings stuffed with sausage meat.

BACKGROUND

In prior art devices and methods for producing sausages, synthetic or natural gut casings are stuffed with a pasty mass such as meat emulsion with the help of a pump or a stuffing machine and portioned with the help of a portioning device, and subsequently divided into single sausages; other types of mass are also stuffed into a casing in the same manner. In most cases, the mass is provided by a stuffing machine that has a feeding hopper and a feed pump.

In one kind of prior art method, a twist point which separates the individual sausage portions from one another is produced in the gut casing by a twist linking unit and the portioning device. In another type of portioning device according to the prior art, sausages are not twisted off, but the casing is coextruded in liquid form around a strand of the food mass. The casing, which in many cases is made of alginate, solidifies. After producing such a stuffed casing, and during further conveying, pre-crimping members pierce the casing stuffed with food mass and displace both the food mass and the casing, thus creating a constriction point. For that purpose, laterally projecting pre-crimping members are arranged on the conveyor members at intervals approximately equal to the length of a sausage and converge to form pairs with a pre-crimping member that in operation is opposite on the adjacent spaced-apart conveyor member, thereby constricting the mass in the stuffed casing, together with the casing, in the region of a constriction point.

The sausage portion is then divided with the aid of crimping members. The crimping members are likewise on conveyor members at intervals approximately equal to the length of a sausage. The crimping members known from the prior art have an attachment portion for attaching the crimping members to the conveyor member and a flat crimping portion arranged adjacent the attachment portion. The crimping portion has two legs that open to form a base portion. Although the design of the crimping portions just described ensures that the sausage portions are reliably separated, there is still room for improvement.

For example, it has occasionally been observed in practice that the ends of the portions or sausages are not fully formed at the separation points. For example, the sausage ends may have a shape which is not round and which can then be further shaped in a subsequent cooking process by the sausage shrinking. Such an uneven or non-rounded shape of the sausage ends is sometimes perceived by the consumer as undesirable.

As a result, it would be desirable to develop a separator of the kind initially specified in such a way that the disadvantages encountered in the prior art are eliminated as far as possible. In particular, a device is to be specified that allows the ends of the portions to be given a round and uniform shape.

SUMMARY

These and other technical objects and problems are addressed by the embodiments provided in this invention. To this end, the separator according to embodiments of the invention achieve this at least in part by having the legs be curved on their side facing an adjacently arranged second crimping member in operation, such that the stuffed casing is first constricted in a constriction region with displacement of the mass, and then severed.

The invention makes use of the discovery that, during the relative movement of the oppositely arranged crimping members toward each other and at least partially past each other, and due to the curvature of crimping members, the sausage mixture is initially displaced beyond the actual shape to be produced, namely the round shape of the sausage ends, so that a round shape can form at the sausage end after the mass has relaxed or flowed back. A round portion end can still be formed in an advantageous manner by the curved shape of the crimping members even when the sausage is subjected to cooking after separation and is subject to shrinkage. It is thus possible to produce visually appealing and uniformly formed sausage portions.

The invention is developed by the curvature being in the form of a convex curvature. The convex curvature preferably extends transversely to the conveying direction across the entire width of the crimping member. The convex curvature has proven to be particularly preferable for forming the round or almost round ends of the sausage portions.

According to a preferred embodiment, the base portion also has a curvature which is in the form of a convex curvature, in particular. Both the legs and the base portion preferably have a common convex curvature, with the curvatures merging into each other without creases, i.e., in a mathematically continuous manner. In other words, the legs are shaped like a pair of trousers, with the legs being trouser legs, in a sense. The trousers thus have a basic convex shape.

According to a preferred embodiment, a cutting edge is formed on the inner side of the legs. The cutting edge is preferably designed in such a way the sausage portion can be reliably severed, but without damaging the casing during displacement of the sausage mixture.

According to a preferred embodiment, the crimping member is made of or consists of one of the following materials: metal, polyoxymethylene (POM). The respective materials have proven to be particularly suitable for forming the crimping members. The materials can be selected, for example, according to the diameter or caliber of the sausages to be processed, or also according to the casing material being used or the thickness of the casing material.

The invention is developed by the crimping members being oriented relative to the conveyor members in such a way that the crimping members are guided in the conveying area adjacent and parallel to each other. This ensures that the crimping members can be guided parallel to and adjacent each other, despite the conveyor members being arranged so that they move toward each other in the conveying direction.

According to a preferred embodiment, the conveyor members have receiving elements for receiving the attachment portions of the crimping members. The receiving elements of the conveyor members are designed in such a way that the crimping members can be easily replaced and at the same time form a reliable and durable connection with the conveyor members in operation. In this way, the separator can be easily adapted to different sausage calibers and casing materials, and the crimping members can also be replaced easily in the event of wear.

According to a preferred embodiment, the curved region has a thickness, viewed in the conveying direction, of 5 mm to 20 mm, and a height, viewed in the conveying direction, of 60 mm, in particular.

The thickness range of the curved region has proven to be particularly suitable for facilitating the formation of round or almost round portion ends. The thickness in question is to be understood in such a way that the curvature, in particular the convex curvature, has the relevant thickness in the conveying direction or in the opposite direction to the conveying direction, depending on the orientation of the crimping members, and that the curvature extends, in particular, across the entire thickness range of the crimping member.

The invention is developed by the opening angle of 15° to 120° between the legs. This range of opening angles ensures that the sausage portions are reliably separated and facilitates displacement of the sausage mixture.

The invention has been described above with reference to a separator. In another embodiment, the invention relates to a crimping member for a separator for separating portions from elongate casings stuffed with food mass, in particular for separating sausages from alginate casings stuffed with sausage meat, said crimping member having an attachment portion for attaching it to a movable conveyor member and a crimping portion arranged adjacent the attachment portion, wherein the crimping portion has two legs that open from a base portion.

With regard to the crimping member, the invention achieves the object initially specified by the legs being curved on their side facing an adjacently arranged second crimping member in operation, such that the stuffed casing is first constricted in a constriction region with displacement of the mass, and then severed.

The crimping member is designed in accordance with at least one of the characterizing features of the above embodiments. The crimping member thus utilizes the same advantages and preferred embodiments as the separator according to the invention, and vice versa. Reference is made in this regard to the observations above, the content of which is incorporated here by reference.

In another embodiment, the invention relates to a method for forming and separating portions from elongate casings stuffed with food mass, in particular for forming and separating sausages from alginate casings stuffed with sausage meat, in which method food mass is stuffed by a stuffing machine into the casing to be stuffed, the stuffed casing is conveyed in a conveying direction by a separator, wherein the stuffed casing is brought between two drivable, circulating conveyor members and is constricted and separated in a constriction region by two adjacently arranged crimping members each arranged on a conveyor member.

The invention achieves the object initially specified in respect of the method by the crimping members being curved in such a way that the mass is displaced beyond the sausage shape to be produced, so that a round shape is formed at the ends of the sausage portions after the mass has relaxed or flowed back.

The invention is developed by the separator being designed in accordance with one of the above embodiments.

The method utilizes the same advantages and preferred embodiments as the separator according to the invention and the crimping member according to the invention, and vice versa. Reference is made in this regard to the observations above, the content of which is incorporated here by reference.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

FIG. 4 shows a perspective view of the separator of FIG. 2, in another of several operating states.

FIG. 5 shows a perspective view of the separator of FIG. 2, in yet another of several operating states.

DETAILED DESCRIPTION

Figure 1:
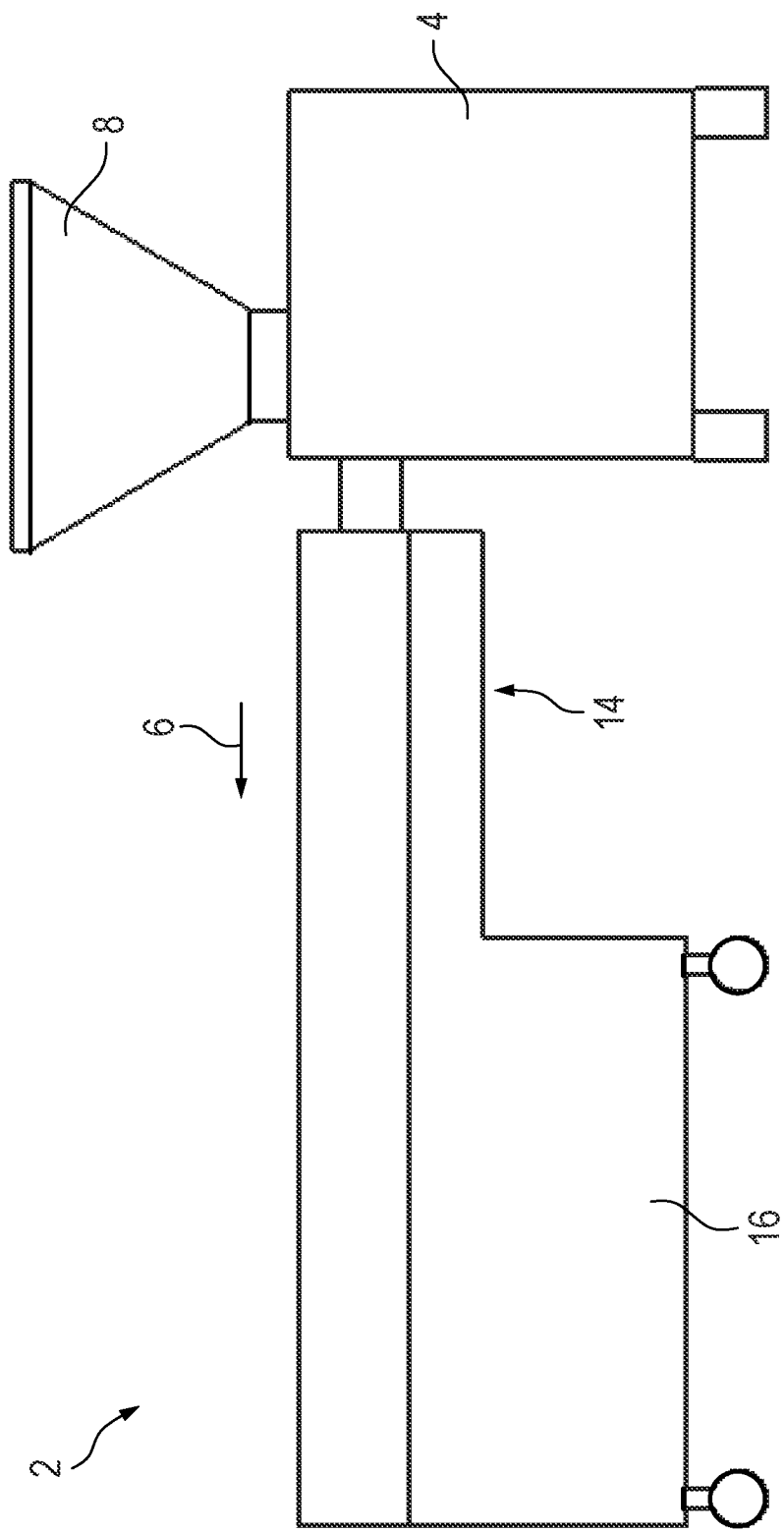
FIG. 1 shows a side view of an assembly for producing portions from a casing stuffed with a food mass, including a stuffing machine and a portioning device, and also a separator.

FIG. 1 shows an assembly 2 for producing portions 10 (not shown, cf. FIG. 2) from a casing 18 stuffed with a mass, in particular a pasty food mass (not shown, cf. FIG. 2), comprising a stuffing machine 4 having a feeding hopper 8 for receiving the food mass, and a portioning device 14 and a separator 16.

Coextrusion is carried out inside portioning device 14, which is not shown in further detail in the Figures, in the course of which the casing 18, for example an alginate casing 18, is applied in fluid form around a strand of the food mass. Portioning device 14 then portions the casing 18 stuffed with food mass, for example using pre-crimping members which impinge on the casing and displace both the food mass and casing 18.

Figure 2:
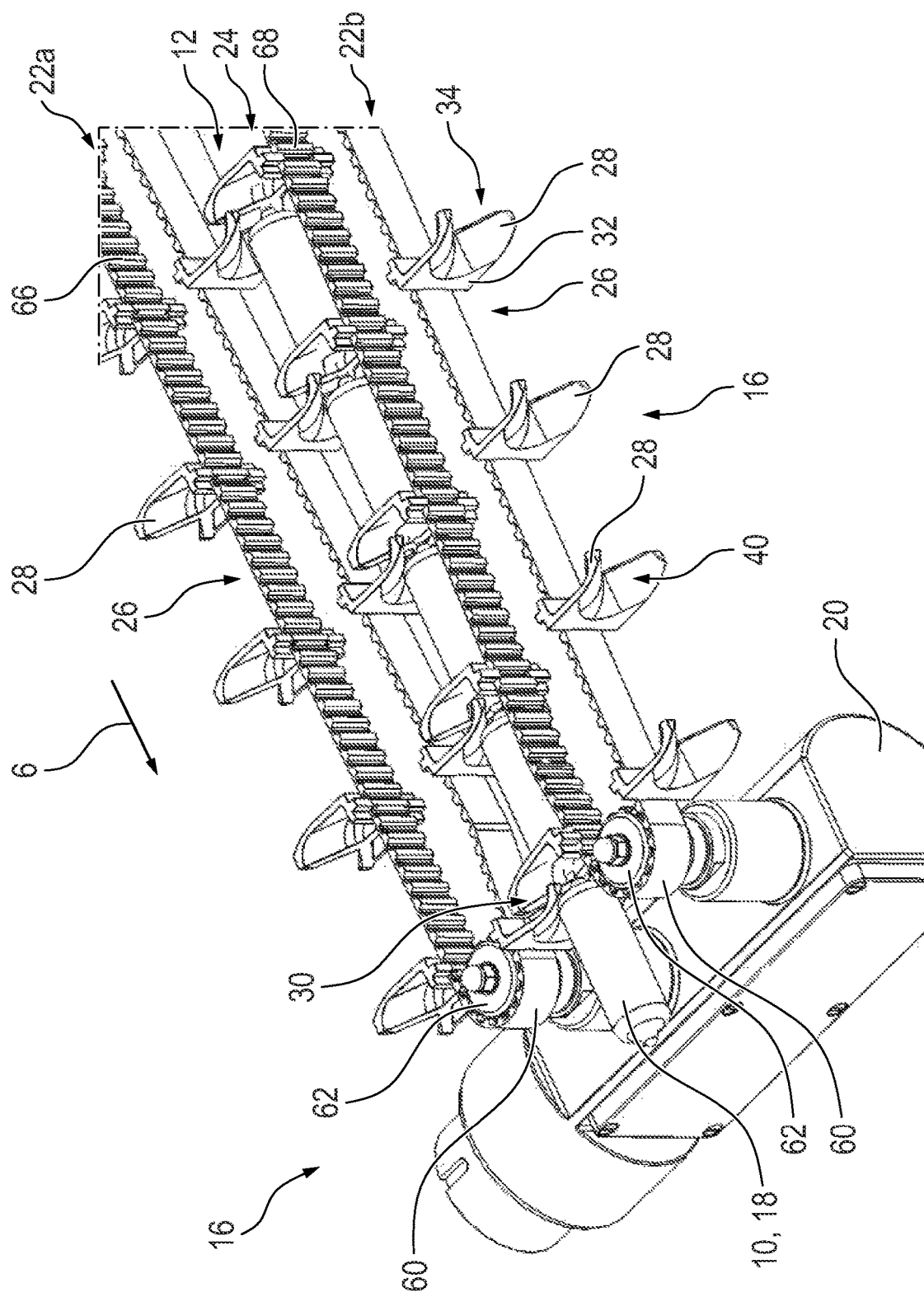
FIG. 2 shows a perspective view of the separator of the assembly in FIG. 1.

Stuffed casings 18, also referred to as sausage strand 12, then proceed in conveying direction 6 to the action range of a separator 16 which is shown in more detail in FIG. 2.

Separator 16 is designed to form sausage portions 10 from sausage strand 12. Separator 16 has two circulating conveyor members 22a, 22b arranged at a distance from each other. Conveyor members 22a, 22b can be driven by a drive element 20 (e.g., a motor). Conveyor members 22a, 22b each have a conveying area 24, which in operation is moved in a conveying direction 6. The circulating conveyor members 22a, 22b also have a return area 26. Stuffed casings 18 are introduced between the conveying areas 24 of the two conveyor members 22a, 22b and conveyed in conveying direction 6. Conveyor members 22a, 22b are oriented in such a way that the distance between conveyor members 22a, 22b in the conveying area 24 decreases conveying direction 6.

Crimping members 28 are arranged on each of conveyor member 22a, 22b and project laterally from conveyor member 22a, 22b. Two crimping members 28 of each one of conveyor members 22a, 22b are arranged adjacent one another. Due to the orientation of conveyor members 22a, 22b relative to each other, crimping members 28 move toward each other when conveyor members 22a, 22b are moved in conveying direction 6. In other words, crimping members 28 are moved parallel to each other and toward each other and at least partially past each other when conveyor members 22a, 22b move in conveying direction 6.

Crimping members 28 each have an attachment portion 32 for attaching crimping members 28 to conveyor member 22a, 22b. A crimping portion 34 is arranged adjacent attachment portion 32. Crimping members 28 are provided with a curvature 40 on a side facing away from the respective adjacently arranged crimping member 28. Stuffed casing 18 is first constricted in a constriction region 30 with displacement of the stuffing mass, and then severed.

Crimping members 28 are oriented relative to conveyor members 22a, 22b in such a way that crimping members 28 are guided in conveying area 24 adjacent and parallel to each other. Conveyor members 22a, 22b each have a conveyor belt 66, 68. Conveyor belts 66, 68 are driven by a toothed belt drive 62. A deflection region 60 is located between conveying area 24 and return area 26.

Figure 3:
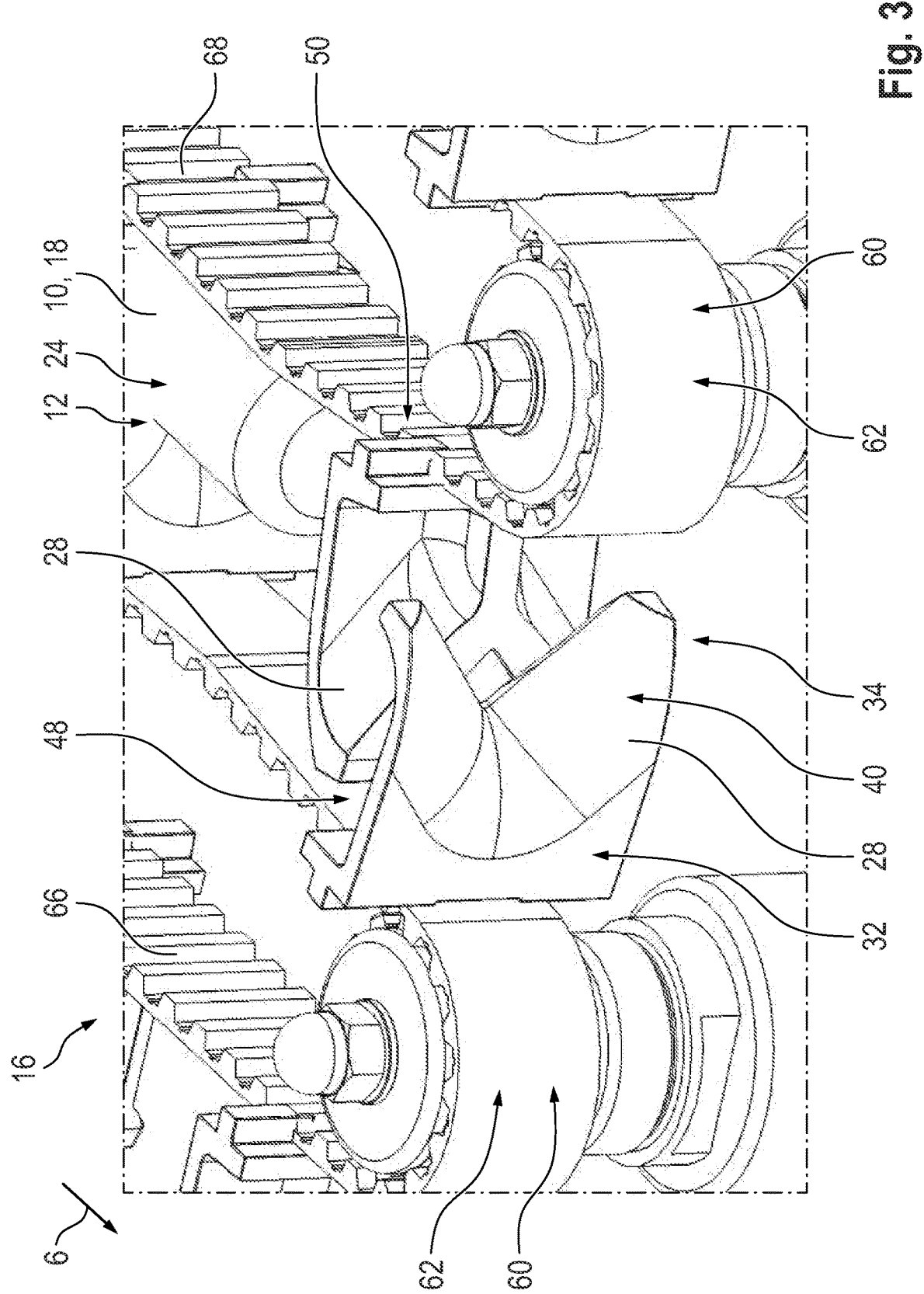
FIG. 3 shows a perspective view of the separator of FIG. 2, in one of several operating states.

FIG. 3 shows a detailed view of separator 16. As has already been described with reference to FIG. 2, conveyor belts 66, 68 are each driven by a toothed belt drive 62. The toothed belt drives 62 that can be seen in FIG. 3 are arranged in the region of deflection region 60. Conveyor belts 66, 68 have receiving elements 50 in which crimping members 28, in particular attachment portion 32 of crimping members 28, are arranged.

In the state shown in FIG. 3, the crimping members 28 guided oppositely and adjacent each other have already been displaced relative to each other in such a way that only a reduced cross-section remains between the adjacent crimping members 28, in this case an open, diamond-shaped cross-section. In operation, the constriction region 30 of sausage portion 10 extends through the open cross-section, although this is not shown here.

Due to the further onward movement of crimping members 28 in conveying direction 6, crimping members 28 are moved further relative to each other in the direction of the respective diagonally opposite crimping member 28, with the result that the free cross-section is further reduced, and sausage portion 10 is finally separated. Such a state shortly before separation of sausage portion 10 is shown in FIG. 4. It can also be seen from FIG. 4 that sausage portion 10 is displaced, beyond the sausage shape to be produced, by the shape of the crimping member 28 which is arranged here in the foreground. This causes a rim-shaped sausage end 70 to first be formed. Two sausage portions 10 with such rim-shaped sausage ends 70 are illustrated in FIG. 5.

Figure 6A:
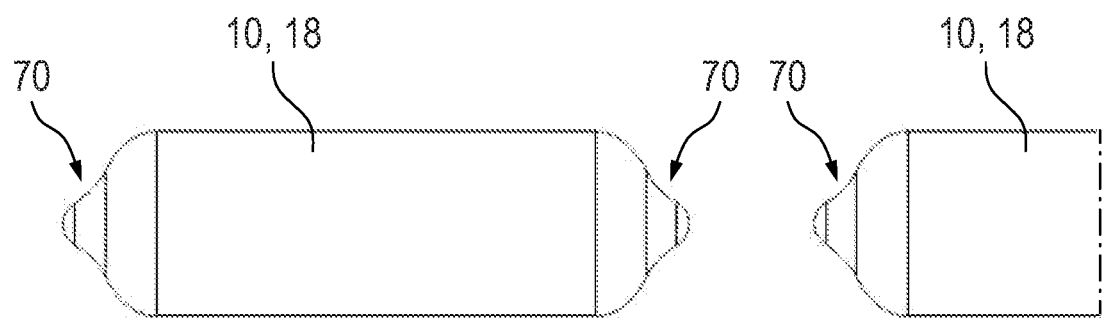
FIGS. 6a and 6b show side views of sausage portions formed by the separator of FIGS. 1 and 2.
Figure 6B:
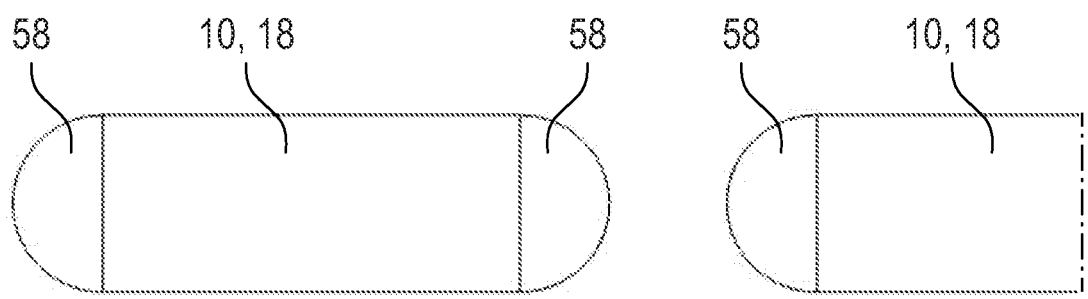

As is also shown in FIG. 6a, the respective rim-shaped sausage end 70 is formed immediately after sausage portion 10 is separated by the crimping member 28 according to the invention. However, sausage 10 does not keep the rim-shaped sausage ends 70 that are shown in FIG. 6a and also in FIGS. 4 and 5, but acquires a round sausage end 58 after some time, in particular after the mass inside casing 18 has relaxed or flowed back. In other words, due to the specific shape of crimping members 28, which have a curvature 40 according to the invention, the sausage mixture is first displaced beyond the shape to be produced, namely the round shape, which ultimately results in the round sausage ends 58 being formed after was equalization processes within the mass.

Figure 7:
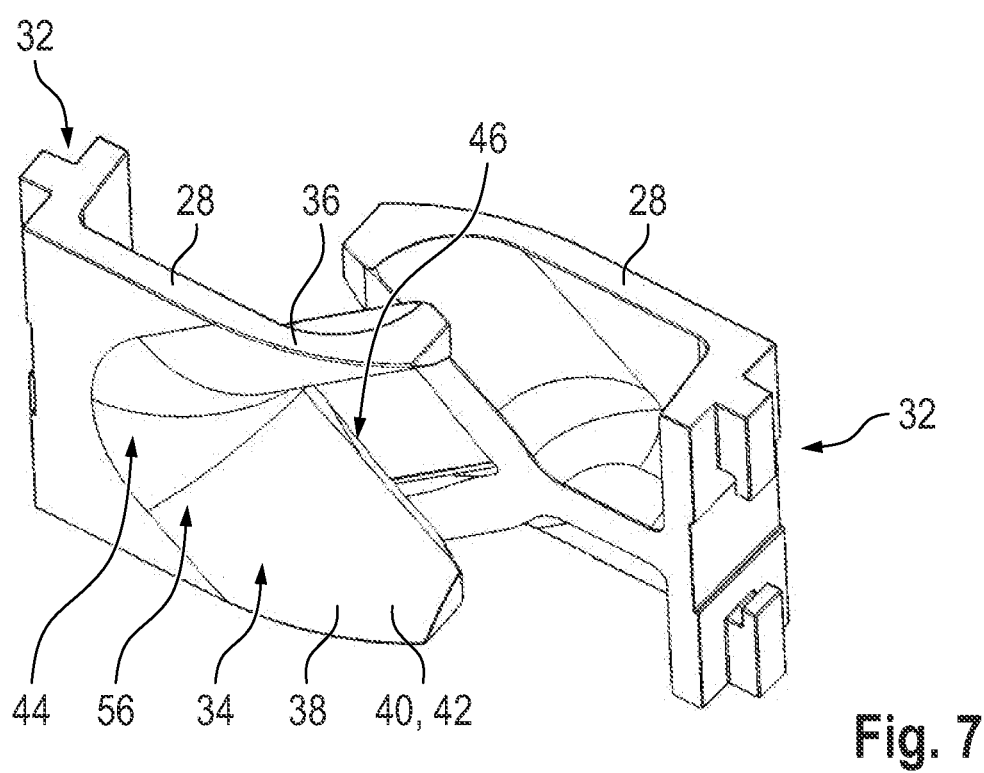
FIG. 7 shows a perspective view of crimping members according to one embodiment of the invention.
Figure 8:
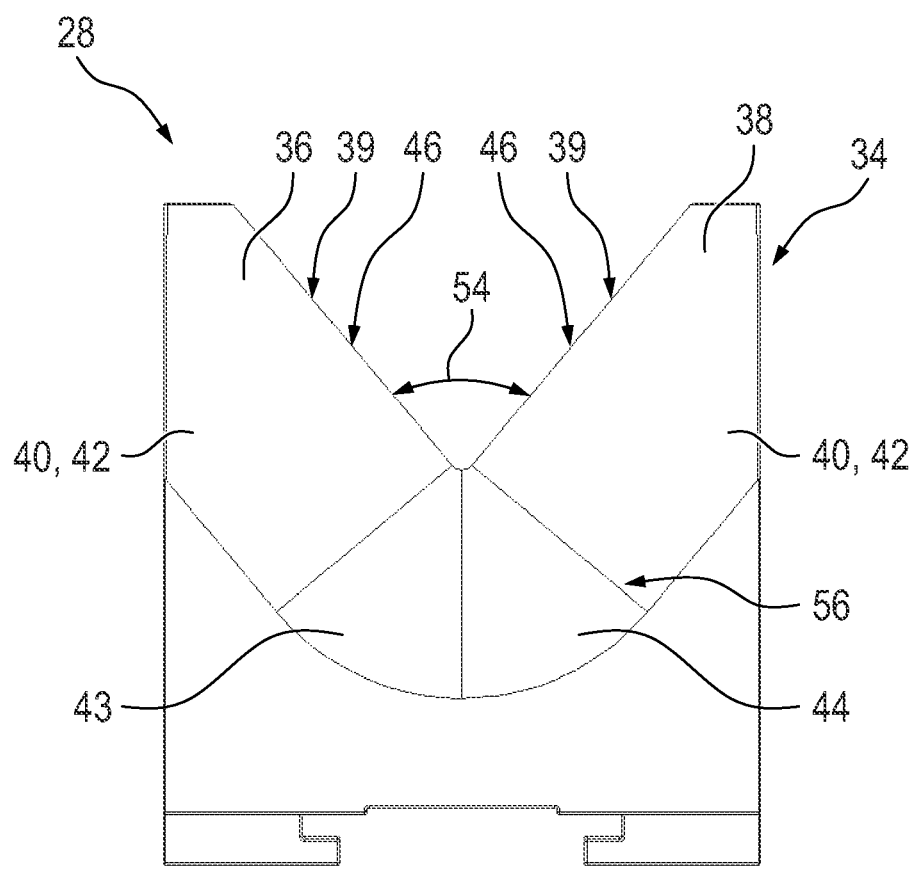
FIG. 8 shows an end view of crimping members according to another embodiment of the invention.
Figure 9:
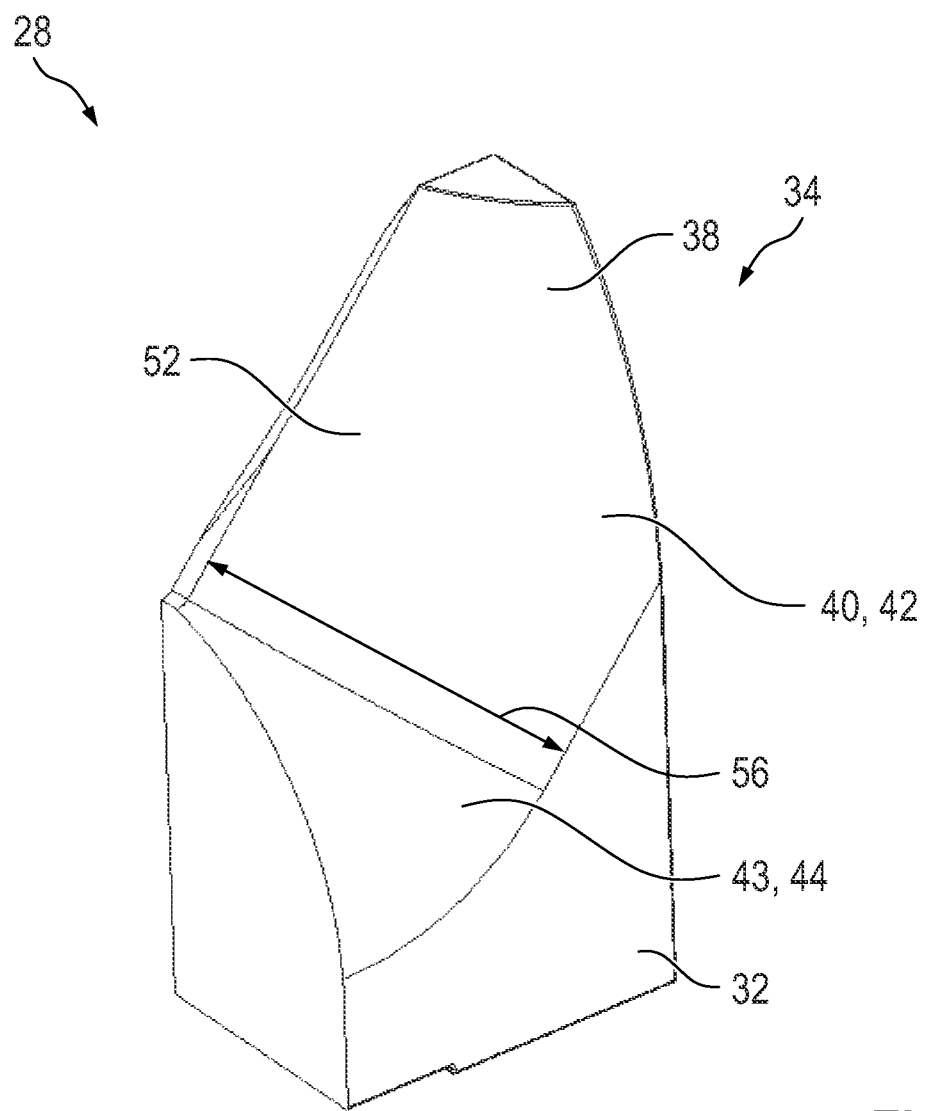
FIG. 9 shows a perspective view of crimping members according to yet another embodiment of the invention.

Crimping members 28 according to the invention shall now be described in more detail with reference to FIGS. 7 to 9. Crimping member 28 has an attachment portion 32 for attaching crimping member 28 to conveyor member 22a, 22b. A crimping portion 34 is arranged adjacent attachment portion 32. Crimping portion 34 has two legs 36, 38 that open to form a base portion 43. Legs 36, 38 are provided with a curvature 40 on their side which in operation faces away from the adjacently arranged second crimping member 28. Due to curvature 40, stuffed casing 18 is first constricted in a constriction region 30 with displacement of the mass, and then severed. In this case, curvature 40 takes the form of a convex curvature 42. Base portion 43 likewise has a curvature which is in the form of a convex curvature, in particular.

A cutting edge 46 is formed on the inner sides of legs 39. Curved region 40 has a thickness 52 in conveying direction 6. Legs 36, 38 also have an opening angle 54. Transition 56 between the curvature of base portion 43 and the curvature 40 of legs 36, 38 is free of creases.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A separator for separating portions from elongate casings stuffed with food mass, comprising:
   two circulating conveyor members spaced apart from one another and drivable by at least one drive element, each having a conveying area which in operation is moved in a conveying direction, and a return area,
   wherein the stuffed casing can be introduced between the conveying areas of the two conveyor members and conveyed in the conveying direction, and wherein the conveyor members are oriented in such a way that a distance between the conveyor members in the conveying area decreases in the conveying direction, and
   at least one crimping member arranged on each conveyor member and projecting laterally from the conveyor member,
   wherein two crimping members of the spaced-apart conveyor members are shaped in such a way and arranged adjacent one another in the conveying area, and are moved toward each other when moved in the conveying direction, wherein one of the two crimping members is arranged on one of the conveyor members and a second of the two crimping members is arranged on the other of the conveyor members,
   wherein the crimping member has an attachment portion for attaching the crimping member to the conveyor member and a crimping portion arranged adjacent the attachment portion,
   wherein the crimping portion has two legs that open from a base portion, with the two legs and the base portion collectively defining an inner side and an outer side of the crimping portion, the inner side facing towards an adjacently arranged second crimping member in operation, wherein each of the legs includes a planar cutting edge formed at the inner side, the planar cutting edges of the two legs collectively defining a generally V-shaped opening configuration at the inner side of the crimping portion, and wherein the legs and the base portion further include a common constricting surface extending from the planar cutting edges and located at the outer side of the crimping portion, which faces away from the adjacently arranged second crimping member in operation, with the constricting surface at the legs and the base portion being curved with a convex curvature that bends outwardly towards the stuffed casing extending through the crimping member such that the stuffed casing is first constricted by contact with the constricting surface in a constriction region with displacement of the food mass and then severed by the planar cutting edges of the crimping members as the crimping members are moved toward each other during movement in the conveying direction.

2. The separator of claim 1, wherein the stuffed casing severed by the crimping members initially defines a rim-shaped end profile including a concave curved portion adjacent at least one convex curved portion, the concave curved portion extending inwardly towards the food mass inside the stuffed casing and being formed as a result of constricting the stuffed casing with the constricting surface, with the stuffed casing configured to relax to a convex curved rounded end profile after movement away from the crimping members.

3. The separator of claim 1, wherein the crimping member is made of or consists of one of the following materials:
   metal; and
   polyoxymethylene.

4. The separator of claim 1, wherein the crimping members are oriented relative to the conveyor members in such a way that the crimping members are guided in the conveying area adjacent and parallel to each other.

5. The separator of claim 1, wherein the conveyor members have receiving elements for receiving the attachment portions of the crimping members.

6. The separator of claim 1, wherein a curved region at the constricting surface of the legs has a thickness in the conveying direction of 5 mm to 20 mm.

7. The separator of claim 1, wherein an opening angle between the legs is 15° to 120°.

8. The separator of claim 1, wherein a transition between the curvature of the base portion and the curvature of the legs is free of creases.

9. The separator of claim 2, wherein the separator is configured to separate sausages from alginate casings stuffed with sausage meat,
   wherein the crimping member is made of or consists of one of the following materials:
      metal; and
      polyoxymethylene,
   wherein the crimping members are oriented relative to the conveyor members in such a way that the crimping members are guided in the conveying area adjacent and parallel to each other,
   wherein the conveyor members have receiving elements for receiving the attachment portions of the crimping members,
   wherein a curved region at the constricting surface of the legs has a thickness in the conveying direction of 5 mm to 20 mm,
   wherein an opening angle between the legs is 15° to 120°, and
   wherein a transition between the curvature of the base portion and the curvature of the legs is free of creases.

10. A crimping member for a separator for separating portions from elongate casings stuffed with food mass, comprising:
   an attachment portion for attaching the crimping member to a movable conveyor member; and
   a crimping portion arranged adjacent the attachment portion,
   wherein the crimping portion has two legs that open from a base portion, with the two legs and the base portion collectively defining an inner side and an outer side of the crimping portion, the inner side facing towards an adjacently arranged second crimping member in operation,
   wherein each of the legs includes a planar cutting edge formed at the inner side, the planar cutting edges of the two legs collectively defining a generally V-shaped opening configuration at the inner side of the crimping portion, and
   wherein the legs and the base portion further include a common constricting surface extending from the planar cutting edges and located at the outer side of the crimping portion, which faces away from the adjacently arranged second crimping member in operation, with the constricting surface at the legs and the base portion being curved with a convex curvature that bends outwardly towards the stuffed casing extending through the crimping member such that the stuffed casing is first constricted by contact with the constricting surface in a constriction region with displacement of the food mass and then severed by the planar cutting edges of the crimping members as the crimping members are moved toward each other during operation.

11. The crimping member of claim 10, wherein the separator is configured to separate sausages from alginate casings stuffed with sausage meat, and wherein the crimping member includes at least one of the following:
   (i) the crimping member is made of or consists of one of the following materials:
      metal; and
      polyoxymethylene,
   (ii) the crimping members are oriented relative to the conveyor members in such a way that the crimping members are guided in the conveying area adjacent and parallel to each other,
   (iii) the conveyor members have receiving elements for receiving the attachment portions of the crimping members,
   (iv) a curved region of the legs has a thickness in the conveying direction of 5 mm to 20 mm,
   (v) an opening angle between the legs is 15° to 120°, and
   (vi) a transition between the curvature of the base portion and the curvature of the legs is free of creases.

12. The crimping member of claim 10, wherein the stuffed casing severed by the crimping members initially defines a rim-shaped end profile including a concave curved portion adjacent at least one convex curved portion, the concave curved portion extending inwardly towards the food mass inside the stuffed casing and being formed as a result of constricting the stuffed casing with the constricting surface, with the stuffed casing configured to relax to a convex curved rounded end profile after movement away from the crimping members.

13. A method for forming and separating a series of portions from elongate casings stuffed with food mass, comprising:
   a food mass is stuffed by a stuffing machine into a casing to be stuffed,
   the stuffed casing is conveyed in a conveying direction by a separator,
   the stuffed casing is brought between two drivable, circulating conveyor members and is constricted and separated in a constriction region by two adjacently arranged crimping members each arranged on a conveyor member,
   wherein the crimping members are each curved along a constricting surface that faces away from another of the adjacently arranged crimping members in such a way that the food mass is displaced by the constricting surface beyond a sausage shape to be produced to initially form a rim-shaped end profile at the ends of each of the series of portions, the rim-shaped end profile including a concave curved portion adjacent at least one convex curved portion, the concave curved portion extending inwardly towards the food mass inside the stuffed casing and being formed as a result of constricting the stuffed casing with the constricting surface, and
   moving each of the series of portions away from the separator and the crimping members to allow the stuffed casing to relax to produce a convex curved rounded end profile so that a round shape is achieved at the ends of each of the series of portions after the food mass has relaxed or flowed back.

14. The method according to claim 13, further comprising:
   providing the separator so as to include:
   two of the circulating conveyor members spaced apart from one another and drivable by at least one drive element, each having a conveying area which in operation is moved in a conveying direction, and a return area, wherein the conveyor members are oriented in such a way that the distance between the conveyor members in the conveying area decreases in the conveying direction, and
   the at least two crimping members, one of each being arranged on each conveyor member and projecting laterally from the conveyor member,
   wherein two crimping members of the spaced-apart conveyor members are shaped in such a way and arranged adjacent one another in the conveying area, and are moved toward each other when moved in the conveying direction,
   wherein the crimping member has an attachment portion for attaching the crimping member to the conveyor member and a crimping portion arranged adjacent the attachment portion,
   wherein the crimping portion has two legs that open from a base portion, with the two legs and the base portion collectively defining an inner side and an outer side of the crimping portion, the inner side facing towards an adjacently arranged second crimping member in operation,
   wherein each of the legs includes a planar cutting edge formed at the inner side, the planar cutting edges of the two legs collectively defining a generally V-shaped opening configuration at the inner side of the crimping portion, and
   wherein the legs and the base portion further include the constricting surface that extends from the planar cutting edges and is located at the outer side of the crimping portion, which faces away from the adjacently arranged second crimping member in operation, with the constricting surface at the legs and the base portion being curved with a convex curvature that bends outwardly towards the stuffed casing extending through the crimping member such that the stuffed casing is first constricted by contact with the constricting surface in a constriction region with displacement of the food mass and then severed by the planar cutting edges of the crimping members as the crimping members are moved toward each other during movement in the conveying direction.

15. The method of claim 14, wherein the separator is configured to separate sausages from alginate casings stuffed with sausage meat, and wherein the separator includes at least one of the following:
   (i) the crimping member is made of or consists of one of the following materials:
      metal; and
      polyoxymethylene,
   (ii) the crimping members are oriented relative to the conveyor members in such a way that the crimping members are guided in the conveying area adjacent and parallel to each other,
   (iii) the conveyor members have receiving elements for receiving the attachment portions of the crimping members,
   (iv) a curved region of the legs has a thickness in the conveying direction of 5 mm to 20 mm,
   (v) an opening angle between the legs is 15° to 120°, and
   (vi) a transition between the curvature of the base portion and the curvature of the legs is free of creases.

* * * * *